United States Patent [19]

Gill

[11] 4,448,572
[45] May 15, 1984

[54] PICTURE FRAMING

[76] Inventor: Cyril A. Gill, 36 Grove Rd., Eastbourne, Sussex, England

[21] Appl. No.: 417,130

[22] Filed: Sep. 13, 1982

[51] Int. Cl.³ ............................................. B23B 47/28
[52] U.S. Cl. ............................ 408/115 R; 408/72 R; 408/97
[58] Field of Search .............. 408/115 R, 72 R, 72 B, 408/97

[56] References Cited

U.S. PATENT DOCUMENTS

| 100,731 | 3/1870 | Crane | 408/115 |
|---|---|---|---|
| 3,464,296 | 7/1969 | Harper | 408/115 |
| 3,557,641 | 1/1971 | Schwandt | 408/115 X |
| 3,695,318 | 10/1972 | Maury | 408/72 X |
| 4,158,523 | 6/1979 | Schotzko | 408/115 R |
| 4,174,917 | 11/1979 | Brower | 408/72 R |
| 4,332,514 | 6/1982 | Dergo | 408/115 R X |

Primary Examiner—William R. Briggs

[57] ABSTRACT

A method of joining the mitred ends of two picture frame mouldings includes drilling a precisely positioned hole in the end face of each moulding and positioning a dowel in the holes prior to gluing the end faces together whereby the dowel serves to correctly relatively position the faces. Apparatus for facilitating correct positioning of the dowel holes comprises a frame moulding guiding member slidably mounted in a groove formed in a horizontal base plate. A guiding bush for a drill is provided on a vertically displaceable slide. The two edges of the guiding member nearest the slide are at 90° to each other and 45° to the axis of the bush. In use a frame moulding is clamped against one edge of the guiding member with the guide and slide members appropriately positioned and the end face of the moulding is drilled through the bush. The other moulding to be joined is clamped against the other edge of guiding member and similarly drilled.

10 Claims, 4 Drawing Figures

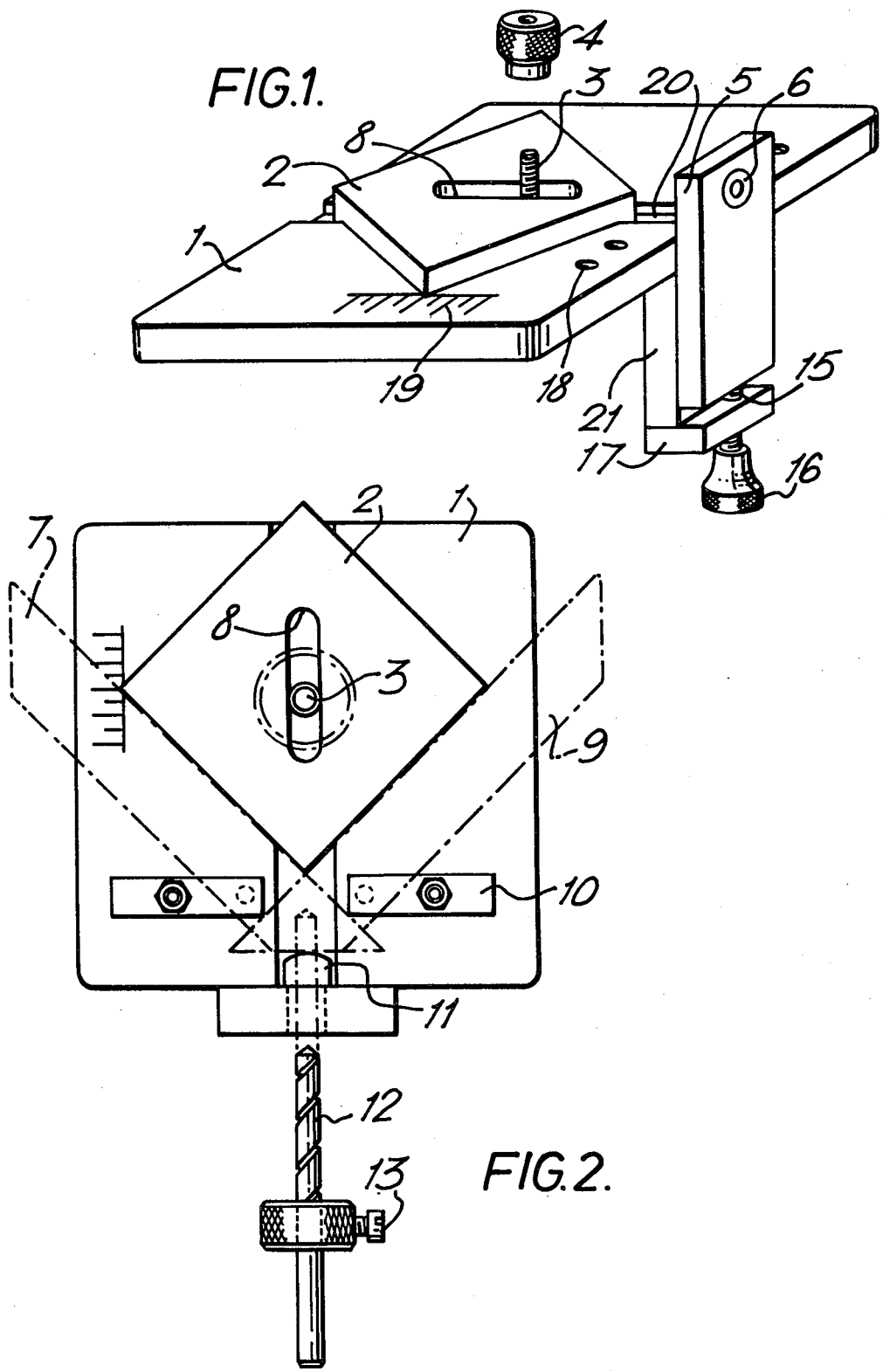

PICTURE FRAMING

This invention relates to a method and apparatus for making picture frames.

The making of picture frames has hitherto been a time consuming and expensive process and requires some skill before consistent results are obtained. In the most common prior art method the frame mouldings are cut and mitred so that they can be correctly located in their final positions. The appropriate faces are then glued and the mouldings are held in the correct position by means of nails until the glue has set. This method has several disadvantages; for instance, there is a risk of splitting the mouldings with the nails and care is needed when inserting the nails to ensure that the mouldings are correctly aligned. After this operation is finished the nail holes are filled and painted.

It is an object of the invention to overcome these disadvantages.

According to one aspect of the present invention, there is provided an apparatus for facilitating the correct positioning of dowel holes in the mitred ends of picture frame mouldings to be joined, comprising a base plate arranged to be positioned horizontally in use and having a slide member mounted adjacent one edge thereof and a positioning member mounted on the upper surface thereof, the slide member being provided with a drill guide having a horizontal axis along which the drill, in use, moves and means for adjusting the vertical position of the drill guide axis relative to the base plate, said positioning member having guide faces thereon, each guide face lying in a plane which makes an angle of substantially 45° with the axis of said drill guide, there being further provided means for effecting the relative movement of said slide and positioning members towards and away from each other while maintaining said guide faces and the axis of said drill guide in the above said relationship. In a preferred embodiment, the axis of the drill guide is perpendicular to and intersects the line of the intersection of the planes in which the guide faces lie. Preferably the drill guide is in the form of a drill bush.

In use, the ends of a moulding are mitred at 45° and the moulding is then placed on the base plate with one of its edges abutting one of the guide faces in such a manner that a mitred face of the moulding can be brought into position adjacent the slide member and further that the plane in which said moulding face lies is generally perpendicular to the axis of said drill bush. Adjustment of the relative positioning of the slide and positioning member may be required. The slide member height is then adjusted so that the drill bush will guide the drill bit into a suitable portion of the moulding.

The mitred end of a second moulding may then be positioned and drilled in a similar manner but this time the moulding will be positioned with its edge abutting the other guide face. The fixed relationship between the guide faces and the drill axis ensures that the hole in each moulding is exactly the same distance from the edge which abutted the guide face.

Thus the invention also provides a method of joining two mouldings, comprising mitreing the ends to be joined so that a face is formed at the end of each moulding, the plane in which the face lies being substantially at 45° to the longitudinal axis of the moulding, forming a hole in each of said faces with apparatus as defined above in such a manner that the longitudinal axis of said hole is perpendicular to the face in which the hole is formed and further so that when the mouldings are correctly positioned together, the longitudinal axis of the hold in one of said faces is aligned with the longitudinal axis of the hole in the other of said faces, each of said holes being of the same diameter, positioning a dowel in said holes and gluing said faces together, the dowel being of substantially the same diameter as the hole so as to correctly position the mouldings together during the gluing operation.

If desired there may be more than one pair of holes in the mating faces of the joint.

The present invention offers several advantages over the prior art. A good and accurate join is assured. A picture frame made according to the invention is cheaper and stronger than prior art picture frames. Also the frame can be assembled easily and quickly by someone inexperienced in such matters. Also the risk of splitting the moulding with the securing nails is obviated and no tidying up work is necessary after the joint is finished.

Preferably there is provided means for clamping the moulding to the base plate during the drilling operation. For this purpose tapped holes may be provided in the base plate.

In a preferred embodiment, the positioning member is in the form of a square plate and is adapted to slide in a groove provided on the base plate and can be secured thereto by means of a knurled nut and a bolt passing vertically through the groove of the base plate and a slot in the positioning member. The slot is located over the groove and is parallel thereto and is provided to permit the relative movement of the positioning and slide members. The base plate may be provided with a downwardly projecting portion at the position adjacent the location of the slide member. This downwardly projecting portion may have a groove therein for guidance of the slide member and may have attached thereto the means for effecting the vertical adjustment of said slide member. Preferably the base plate and said downward projecting portion are formed from a one piece casting. The drill bush may also be removable and, in this case, several drill sizes can be used merely by selecting a different size bush. When the bush is removable, means are provided by releasably retaining it in the slide member.

During assembly of a picture frame, since each moulding is rigidly positioned relative to its adjacent moulding, the four mouldings involved may be glued and assembled together and left for the glue to set without any clamping, or they may be held under a slight compressive force.

The drill bit used may be provided with a collar and locking screw to limit the depth to which the drill penetrates the moulding. This reduces the risk of drilling through to the part of the moulding which is actually seen.

Clamp means may be provided to fit the apparatus to a work bench.

In another embodiment the drill and motor therefor may be integral with the apparatus of the invention.

An embodiment of the invention will now be described by way of example only and with reference to the accompanying drawings, in which:

FIG. 1 is a perspective view from above showing a first embodiment of apparatus in accordance with the invention.

FIG. 2 is a plan view of the apparatus of FIG. 1.

Figure 3:
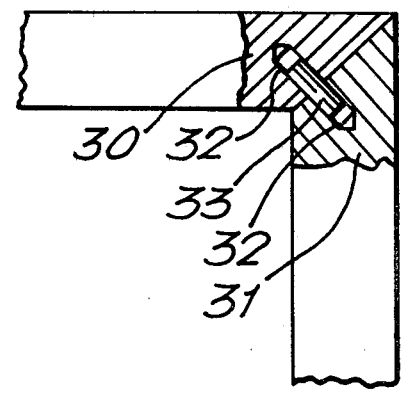
FIG. 3 is a plan cross-section view of two mouldings joined in accordance with the invention.

Referring to FIG. 1 there is shown a base plate 1 having a thereon a positioning member 2 guided on the base plate 1 by means of projections which slidingly engage with a groove 20 in the base plate. Relative movement of the positioning member and the base plate is afforded by a slot 8 in the positioning member which is parallel to and positioned over groove 20 and has projecting therethrough a screw 3. Positioning member 2 can be locked at any desired location by means of screw 3 and knurled nut 4. The base plate groove and the positioning member are machined to close tolerances to facilitate accurately formed joints. The adjacent sides of positioning member 2 are machined substantially perpendicular to each other. The base plate 1 may also be provided with a scale 19 to facilitate repeated use of the apparatus with a variety of different width mouldings.

At one end of the groove 20 there is shown a slide member 5 having therein a drill guide in the form of a drill bush 6 which may be releasably retainable by suitable locking means (not shown). The slide member 5 slides in a groove (not shown) provided in a support member 21 and may be moved upwards or downwards by means of a screw 15 turnable by means of a knob 16, the screw 15 engaging with and passing through a threaded hole in an end plate 17 which in turn is rigidly attached to support member 21.

The end plate 17 and support member 21 may be integral with base plate 1 or alternatively formed separately from the base plate and attached rigidly thereto by suitable means. Locking means (not shown) may also be provided on slide member 5 so that any backlash in the thread of screw 15 does not cause relative movement between the axis of drill bush 6 and the base plate 1.

Referring now to FIG. 2 there is shown a plan view of the apparatus of FIG. 1 with the addition of mouldings 7 and 9 shown in chain line. It should of course be realised that only one moulding can be placed on the apparatus in either of the positions shown at any given time, both locations being shown for completeness. Also shown in this figure are clamps 10 which can be secured to the base plate by means of threaded holes 18 (FIG. 1) or any other suitable means, such means being well known. These clamp means secure the mouldings in the position shown to facilitate the drilling of the moulding.

The clamps may be of any form, serving only to secure the moulding rigidly on the base plate 1 and against one side face of positioning member 2. There is also shown a stop 11 to facilitate the positioning of the drill hole with respect to the moulding and for the sake of completeness a drill bit 12 is shown together with a lockable collar 13 to set the depth of penetration of the drill bit.

A variety of holes may be drilled in each moulding end face by adjusting the slide member height and the position of the positioning member towards and away from the slide member. In use, each moulding will be placed once in position 7 and once in position 9 for each setting of the slide member's height and positioning member's position so that each end is drilled. Each time the moulding is positioned in the apparatus, a hole is drilled into the moulding by passing the drill through drill bush 6 and stop 11 and into the moulding. Once each moulding has been drilled at both ends with this particular combination of settings, a new series of holes is started if desired or required by adjusting the slide members height and the position of the positioning member. Thus by drilling one set of holes and then changing the slide member height and the position of the positioning member, accuracy is preserved in the positioning of the holes in the mouldings.

FIG. 3 shows a cross-section of a pair of mouldings incorporating the joining means of the present invention. The two mouldings 30, 31 are each shown with a drill hole 32 therein and a dowel 33 located partially in each drill hole, serving to effect the correct alignment of the mouldings.

Figure 4:
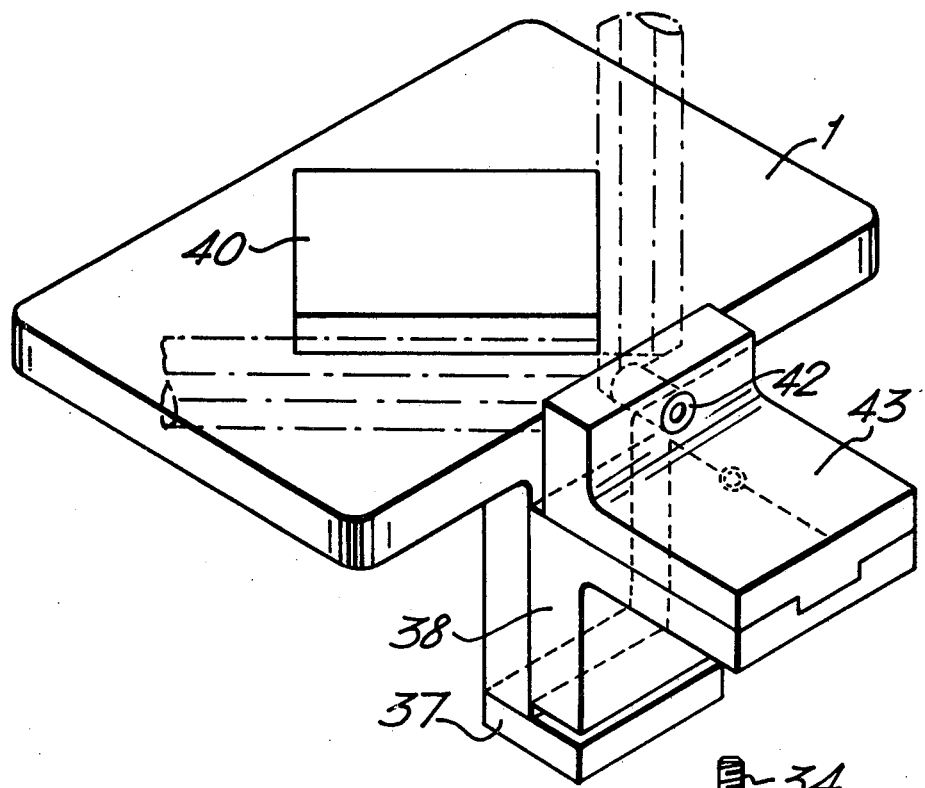
FIG. 4 is a perspective view from above of a second embodiment of apparatus in accordance with the invention.

Referring now to FIG. 4, there is shown a second embodiment of the apparatus of the present invention. A base plate 1 has a fixed positioning member 40 fixed thereto. A horizontal slide member 43 has a drill bush 42 attached thereto which serves as the drill guide of the invention. Slide member 43 is adapted to be horizontally slideable on a vertical slide 38 by means of a groove provided on slide 38 and a corresponding projecting on the slide member 43. The slide 38 is adjustable in a similar manner to the slide member 5 of FIG. 1 by means of screw 36 and hand wheel 35, there being again a groove (not shown) machined in the downwardly projecting portion of the base plate to effect the guidance of slide 38. The slide member 43 is also lockable to slide 38 by the use of a locking screw 34 which passes through a slot (not shown) in the horizontal portion of slide 38 parallel to the groove therein and into a suitably located threaded hole in the slide member 43. Thus in use a moulding is positioned adjacent the positioning member 40 and the position of the drill bush is adjusted by adjustment of the slide 38 and the slide member 43 until it is located over the portion of the moulding which is desired to be drilled. The embodiment may, of course, be provided with the features of the previous embodiment such as the clamping means for the mouldings and locking means for the vertical slide 38.

In both the embodiments described, the faces of the positioning member 2 or 40 which guide the moulding are perpendicular and are at 45° to the axis of the drill bush. The line of intersection of these guide faces is perpendicular to and intersects the drill axis and in the first embodiment the groove 20 is parallel to the drill axis.

What is claimed is:

1. Apparatus for facilitating the correct positioning of dowel holes in the mitered ends of picture frame moldings which are to be joined comprising:
   a base plate arranged to be positioned horizontally when in use, said base plate having a planar upper surface and an elongated guide groove formed in said upper surface, said groove having an axis;
   slide means mounted from said base plate adjacent one edge thereof, said slide means having an adjustable portion which defines a plane perpendicular to the plane of said base plate upper surface, said slide means adjustable portion intersecting an extension of the axis of said base plate groove;
   a drill guide mounted in said slide means adjustable portion, said drill guide having an axis, said drill guide being mounted so that the axis thereof is parallel to the plane of said base plate upper surface;

means for imparting motion to said slide means adjustable portion to thereby adjust the position of said drill guide axis relative to said base plate upper surface;

a moulding positioning member extending above and slidably mounted on the upper surface of said base plate, said positioning member engaging said guide groove and having at least a pair of guide faces thereon, each of said guide faces lying in a plane which intersects said drill guide axis at an angle of substantially 45°, the intersection of said guide faces defining a line which is intersected by and transverse to an extension of said drill guide axis; and adjustment means, said adjustment means allowing movement of said positioning means along said guide groove to vary the spacing between said slide means and positioning member while maintaining the angular relationship between the axis of said drill guide and the planes in which said positioning member guide faces lie, said adjustment means engaging said positioning member and being operable to retain said positioning member at a selected location.

2. Apparatus as claimed in claim 1 wherein said adjustment means for said positioning member comprises a screw passing through a slot in the positioning member and a clamping nut carried by the screw.

3. Apparatus as claimed in claim 1 wherein the drill guide is in the form of a drill bush and a drill will move along said drill guide axis when said apparatus is in use.

4. Apparatus as claimed in claim 3 wherein the drill bush is removable and wherein said apparatus further comprises means for releasably retaining the drill bush in the slide means adjustable portion.

5. Apparatus as claimed in claim 1 further comprising means for clamping a moulding against at least one of the guide faces of said positioning member during the drilling of a dowel hole.

6. Apparatus as claimed in claim 1 wherein the slide means comprises a downwardly projecting portion of said base plate.

7. Apparatus as claimed in claim 6 wherein the downwardly projecting portion of said base plate has a groove therein for guiding the slide means adjustable portion.

8. Apparatus as claimed in claim 7 wherein said slide means further comprises a lateral extension of said downwardly projecting base plate portion and wherein said lateral extension has mounted thereon said means for imparting motion to the slide means adjustable portion.

9. Apparatus as claimed in claim 8 wherein the base plate and the downwardly extending portion thereof are integrally formed as a single casting.

10. Apparatus as claimed in claim 1 wherein the positioning member is in the form of square plate.

* * * * *